United States Patent [19]

Dominguez

[11] 4,049,595
[45] Sept. 20, 1977

[54] BLOCK COPOLYMER COMPOSITIONS
[75] Inventor: Richard J. G. Dominguez, Katy, Tex.
[73] Assignee: Shell Oil Company, Houston, Tex.
[21] Appl. No.: 679,591
[22] Filed: Apr. 23, 1976
[51] Int. Cl.$^2$ .......................... C08K 5/01; C08L 7/00
[52] U.S. Cl. ...................................... 260/5; 36/32 R; 260/33.6 AQ; 260/876 B
[58] Field of Search ........... 36/32 R; 260/5, 33.6 AQ, 260/892, 876 B

[56] References Cited

U.S. PATENT DOCUMENTS

| | | | |
|---|---|---|---|
| 2,972,593 | 2/1961 | Daly | 260/892 |
| 3,594,452 | 7/1971 | De La Mare et al. | 260/879 |
| Re. 28,236 | 11/1974 | Hendricks et al. | 36/32 R |

OTHER PUBLICATIONS

Modern Plastics Encyclopedia, 1968 (McGraw-Hill), (New York), p. 276.

Primary Examiner—Donald E. Czaja
Assistant Examiner—H. H. Fletcher
Attorney, Agent, or Firm—Dean F. Vance

[57] ABSTRACT

Block copolymer compositions employed for use in footwear articles show improved performance when the usual crystal grade polystyrene is replaced with high impact polystyrene.

10 Claims, No Drawings

BLOCK COPOLYMER COMPOSITIONS

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. No. Re. 28,236. In general, these shoe component compositions usually comprise a mixture of block copolymer, extending oil, polystyrene and possibly a filler. Many other end-uses of block copolymers are known, such as in pharmaceutical applications, sportswear and other artifacts. For the most part, these block copolymers have proved to be particularly advantageous in many respects, including flexibility, processability, lack of vulcanization requirement and wet slip. However, in certain respects, short-comings have been noted. With respect to footwear, one of the major short-comings of the block copolymer compounds such as those referred to in U.S. Pat. No. Re. 28,236 is the phenomenon known as "elephant hide". Moreover, these prior art compounds are often difficult to remove from molds and are prone to exhibit surface markings.

The term "elephant hide" refers to a problem primarily apparent in relatively thick sections of stock, whether it be soling, heavy sheeting or the like. The phenomenon is readily apparent when the compound, deficient in the respect, is flexed. During the flex, the compressed surface of such articles exhibits a ridged appearance. A new composition has been found that greatly reduces the elephant hide characteristics of the finished shoe soles.

SUMMARY OF THE INVENTION

The present invention is a composition suitable for footwear applications comprising:

| | Parts by Weight |
|---|---|
| (a) a block copolymer having at least two monoalkenyl arene polymer blocks A and at least one elastomeric conjugated diene block B, said blocks A comprising 8–65% by weight of the copolymer; | 100 |
| (b) a high impact polystyrene resin containing from about 1–35 weight percent elastomeric component, said resin having a molecular weight of over about 70,000; | 5–125 |
| (c) a hydrocarbon rubber extending oil; and | 5–175 |
| (d) a finely divided filler. | 0–250 |

Shoe soles made according to the above formulation exhibit excellent hardness with reduced stiffness, improved elephant hide characteristics, and may be produced with improved machine cycle time. Further, compositions of the instant invention exhibit a reduced tendency to delaminate as compared to those compositions employing crystal grade polystyrene.

DETAILED DESCRIPTION OF THE INVENTION

The block copolymers employed in the present composition are thermoplastic elastomers and have at least two monoalkenyl arene polymer end blocks A and at least one elastomeric conjugated diene polymer mid block B. The number of blocks in the block copolymer is not of special importance and the macromolecular configuration may be linear, graft or radial (branched) depending upon the method by which the block copolymer is formed. Much preferred is a radial block copolymer. Typical block copolymers of the most simple configuration would have the structure polystyrene-polyisoprene-polystyrene and polystyrene-polybutadiene-polystyrene. A typical radial polymer would comprise one in which the diene block has three or more branches, the tip of each branch being connected to a polystyrene block. See U.S. Pat. No. 3,594,452. Expressed another way, the invention also contemplates (but is not limited to) the use of configurations such as $A-B-(B-A)_n$ where $n$ varies from 1 to 5. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have average molecular weights between about 5,000 and about 125,000, more preferably between about 15,000 and about 100,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 65%, preferably between about 30% and about 50% by weight. The general type and preparation of these block copolymers are described in U.S. Pat. No. Re. 28,236 and in many other U.S. and foreign patents.

The block copolymers useful in the compositions of this invention may also be hydrogenated either selectively, randomly or completely. Selected conditions may be employed, for example, to hydrogenate the elastomeric diene center block while not so modifying the monoalkenyl arene polymer blocks. Two examples of hydrogenated polymers are polyvinylcyclohexane-hydrogenated polyisoprene-polyvinylcyclohexane and polystyrene-hydrogenated polybutadiene-polystyrene. Preferably, blocks A are characterized in that no more than about 25% of the original aromatic double bonds are reduced by hydrogenation while blocks B are characterized by having at least 75% of the aliphatic double bonds reduced by hydrogenation. See generally U.S. Pat. No. 3,595,942.

The polystyrene commonly employed in prior art formulations for footwear is typically termed "crystal grade polystyrene". The present invention employs a high impact polystyrene resin as opposed to the crystal grade polystyrene. The term "high impact polystyrene"

broadly comprises a major proportion of a styrene polymer, as herein defined, and as toughening agent an elastomeric polymer wherein the elastomeric polymer is present as discrete particles dispersed in a matrix of the styrene polymer. Incorporation of the elastomers into styrene polymer increases the impact strength of the polymer.

By "styrene polymer" is meant any solid homopolymer or copolymer of styrene or a nuclear methyl substituted styrene having a softening point not less than 70° C. A preferred styrene polymer is polystyrene. Suitable copolymers can be obtained by copolymerizing styrene with other vinyl aromatic compounds such as ortho-, meta- or para-methyl styrene and 2,4-dichlorostyrene, or with comonomers which are not vinyl aromatic compounds such as acrylonitrile, methyl methacrylate, dimethyl itaconate and alpha-methyl styrene. Valuable compositions may also be derived from copolymers of ortho-, meta- or para-methyl styrene with copolymerizable monomers which are not vinyl aromatic compounds such as acrylonitrile, methyl methacrylate and dimethyl itaconate. In general, the comonomer is employed in a concentration of up to 40 percent by weight of the total monomers. Copolymers comprising approximately 70 parts of styrene with 30 parts of acrylonitrile and approximately 35 parts of styrene with 65 parts of methyl methacrylate and approximately 60 parts of styrene with 40 parts of dimethyl itaconate are well known, commercially available products which can be used to form the high impact polystyrene employed in the instant invention.

Incorporation of the elastomer into the styrene polymer may broadly be accomplished by graft copolymerization or by mechanical mastication of a mixture of elastomer and styrene polymer. However, graft polymerization has become the predominant process in making the impact material, because much less elastomer is required to obtain a desired degree of reinforcement.

Graft polymerization usually entails dissolving the elastomer in the styrene monomer, followed by polymerizing the styrene by thermal or catalytic initiation. The elastomer thus is the prepolymer on which the polystyrene chains are grafted. However, the present high impact polystyrene prepared by graft copolymerization should be distinguished from the well known graft polymerized styrene-butadiene copolymer, since in the latter case, the SBR copolymers consist essentially of molecules of substantially identical chemical composition. By contrast, the high impact polystyrene polymers employed herein are two phase systems which are produced by polymerizing a solution of elastomers in styrene under well known conditions.

Various methods of preparing high impact polystyrenes are disclosed in U.S. Pat. Nos. 2,694,692; 3,317,918; 3,129,199; 3,639,517; 3,810,957; and 3,929,936. The various elastomers that can be employed include polybutadiene (preferably having a cis 1,4 content of over about 30%), styrene-butadiene random copolymer, polyisoprene, natural rubber, styrene-butadiene block copolymers (particularly those described above), silicone rubber, and mixtures thereof. Most commercial grades of high impact polystyrene employ polybutadiene as the toughening agent.

The weight percentage of elastomer in the high impact styrene polymer varies from about 1% to about 35%, preferably about 2% to about 25%, more preferably about 2% to about 10%.

The weight average molecular weight of the high impact or toughened polystyrene employed herein typically is above about 70,000, preferably from about 130,000 to about 300,000.

The amount of high impact polystyrene employed in the compositions of the instant invention varies from about 5-125 phr, preferably about 20-90 phr. The term "phr" is well known, and means parts by weight per 100 parts by weight rubber (or block copolymer as in the present case).

The hydrocarbon rubber extending oil, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oil include SHELLFLEX® oils, Nos. 310, 371 and 311 (which is a blend of 310 and 371).The amount of extending oil employed varies from about 5-175 phr, preferably from about 80-100 phr.

Additional resins are also employed in the present compositions. The additional resins employed herein are flow promoting resins that are compatible with the monoalkenyl end blocks of the block copolymer and include polymers of alphamethyl styrene, copolymers of alphamethyl styrene and vinyltoluene, coumarone-indene resins, polyindene resins, poly(methyl indene) resins and polystyrene resins of low molecular weight for flow promotion. The amount of end block compatible resin employed varies from about 0-150 phr, preferably 5-50 phr.

The fillers used in the present compositions are well known in the art and include clay, silica, titanium dioxide, carbon blacks, calcium carbonate, and other pigments as well as fibrous fillers such as cellulosic fibers, sawdust, ground cork, etc. Preferred fillers include clay and calcium carbonate. The amount of filler employed varies from 0-250 phr, preferably 5-60 phr. Additional minor amounts of antioxidants, ultra-violet stabilizers and the like may also be added.

The components of this invention may be combined by processes known in the art including blending such as by extrusion, Banbury mixing or by dry-blending procedures. In the latter case, it is preferred that the block copolymer be formed or ground in particles having an average size less than about 4 millimeter diameter onto which the extending oil is absorbed. Following this, the remaining powdered components may be added and vigorously dry-blended therewith such as in well-known dry-blending equipment long used in the PVC dry-blending art.

While the present specification emphasizes the use of these compositions in footwear components, other end-uses also are contemplated. These include for example wire and cable coatings. The present compositions, when so utilized, result in wire and cable products which can be tightly bent or coiled without buckling of the coating. Tubular products such as hoses and the like also are contemplated.

The use of the present composition in footwear includes especially their use in soling when prepared by injection molding and slab soling, such as produced by cutting shoe sole forms from extruded slab-stock. The advantages of the present compositions are most apparent in injection molding of unit soles which are later attached by adhesion or sewing to uppers. In this situation, it has been found that the unit soles are readily removed from the injection mold and have reduced weld line formation on the surface. Furthermore, the sole so produced is resistant to delamination, has a relatively low abrasion, exhibits virtually no elephant hide, and is manufactured with a relatively short cycle time in the mold. These unit soles (which term refers in the trade to a sole including an integral heel portion) are useful both as a leather replacement and as an improvement over the prior art vinyl soles. The compositions also may be used in the manufacture of injected molded canvas shoe soles wherein the soling is directly injection molded onto the canvas upper.

The invention is further illustrated by means of the following illustrative embodiment, which is given for the purpose of illustration alone and is not meant to limit the invention to the particular reactants and amounts disclosed.

ILLUSTRATIVE EMBODIMENT I

In Illustrative Embodiment I, various compositions were prepared using both crystal grade polystyrene and high impact polystyrene. In all compounds, the block copolymer was a styrene-butadiene branched block copolymer (KRATON® 4140 Thermoplastic Rubber). Also, in each compound, the extending oil was a paraffinic oil (SHELLFLEX® 311) and the additive package included 0.6 parts KEMAMIDE E®, (an erucamide) 0.5 parts DLTDP (dilaurylthiodipropionate), 0.5 parts IRGANOX® 1010 (antioxidant covered by U.S. Pat. Nos. 3,285,855 and 3,644,482), and 1.5 parts EPON® 1004 resin (an epichlorohydrin/bisphenol A-type solid epoxy resin). Other components included two grades of crystal polystyrene, an alphamethyl styrene resin (Amoco 18-290), an end block resin (Piccotex 120) vinyl toluene-alpha methylstyrene copolymer), a calcium carbonate filler (Vicron 25-11), and a clay filler (Polyfil XB). The preferred high impact polystyrene contained about 9% butadiene and had the following typical properties:

| PROPERTIES | PS 325A |
|---|---|
| Melt Flow, Condition G, dg/min. | 5 |
| Thermal Properties | |
| Heat Distortion Temp., at 264 psi ° F, annealed | 195 |
| Vicat Softening Point ° F | 215 |
| Injection Molded Mechanical Properties | |
| Tensile Strength at Yield, Psi (2.0 in/min.) | 4000 |
| Ultimate Elongation, % (0.2 in/min.) | 30 |
| Flexural Modulus, psi × $10^5$ | 3.15 |
| Rockwell Hardness, M Scale | 10 |
| Izod Impact, ft-lb/in. of notch | |
| ⅛ inch 73° F | 1.9 |
| ¼ inch 73° F | 1.05 |
| ¼ inch 0° F | 0.70 |

The individual components were mixed on a Banbury Mixer at about 285° F for about 3–5 minutes. Samples of the various compositions were tested according to the following tests:

| Test | Standard Test Number |
|---|---|
| Shore A Hardness | D-2240 |
| Tinius Olsen Stiffness | D-747 |
| Taber Abrasion | D-1044 |
| Ross cut growth | D-1052 |

In addition, the various compositions were used in the injection molding of unit soles in a unit sole mold attached to a Desma rotating table and injection molded by a Monopak molding machine. The pulling force required to remove the unit soles from the mold and the cycle time required were noted for various composition.

The various formulations and test results are presented below in Table I.

Table I

| Composition (Parts by Weight) | 1 | 2 | 3 | 4 | 5 | 6 |
|---|---|---|---|---|---|---|
| Block Copolymer | 156.8 | 156.8 | 156.8 | 156.8 | 156.8 | 156.8 |
| Extending Oil | 42.2 | 42.2 | 42.2 | 42.2 | 42.2 | 42.2 |
| Crystal Polystyrene | 60.0 | 60.0 | — | — | — | — |
| High Impact Polystyrene | — | — | 60.0 | 60.0 | 60.0 | 60.0 |
| Poly(alphamethyl styrene) | 10.0 | 10.0 | 10.0 | — | 10.0 | 10.0 |
| Piccotex 120 | — | — | — | 10.0 | — | — |
| Calcium Carbonate | — | — | — | — | 10.0 | — |
| Clay | — | — | — | — | — | 10.0 |
| Total Parts | 273.1 | 272.1 | 272.1 | 272.1 | 282.1 | 282.1 |
| Specific Gravity | 0.956 | 0.959 | 0.954 | 0.958 | 0.977 | 0.975 |
| Test Results | | | | | | |
| Shore A Hardness (compression molded) Instant /10 sec. | 58/55 | 59/56 | 57/54 | 58/54 | 58/54 | 58/55 |
| Shore A Hardness (injection molded) Instant /10 sec. | 76/73 | 77/74 | 77/73 | 76/72 | 78/74 | 78/74 |
| Taber Abrasion, cc/kc | 0.4017 | .3961 | 0.4028 | 0.4716 | 0.4210 | 0.3816 |
| Tinius Olsen Stiffness, PSI | 3015 | 3377 | 2528 | 2504 | 2470 | 2479 |
| Pulling Force, lbs | 9.0 | 9.1 | 7.8 | 7.25 | 8.2 | 7.4 |
| Cycle Time, minutes | ~2 | ~2 | — | — | ~1.5 | ~1.5 |
| Ross flex test, cut growth flexes to 500% propogation | ~95m | — | ~250m | | | |

As can be seen above, compositions employing high impact polystyrene in place of crystal grade polystyrene have about equal hardness, while at the same time having lower stiffness. This is a definite advantage in shoe soles. Further, the pulling force and cycle time are reduced with compositions formulated according to the instant invention, thereby showing improved commercial value. Most significantly, the compositions of the instant invention do not exhibit the serious elephant hide property found in compositions of the prior art.

What is claimed is:
1. A polymeric composition comprising:
   a. 100 parts by weight of a block copolymer having at least two monoalkenyl arene polymer end blocks A and at least one elastomeric conjugated diene mid block B, each block A having an average molecular weight between about 5,000 and about 125,000 and each block B having an average molecular weight between about 15,000 and about 250,000, said blocks A comprising 8-65% by weight of the copolymer;

b. 5-125 parts by weight of a high impact polystyrene resin containing from about 1-35 weight percent elastomeric component, said high impact polystyrene having a weight average molecular weight of over about 70,000;

c. 5-175 parts by weight of a hydrocarbon rubber extending oil; and d. 0-250 parts by weight of a finely divided filler.

2. A composition according to claim 1 wherein said block A is a polystyrene block, said block B is a polybutadiene block and said high impact polystyrene elastomeric component is a polybutadiene rubber.

3. A composition according to claim 2 wherein said filler is selected from the group consisting of calcium carbonate, clay and silica.

4. A composition according to claim 1 wherein said block copolymer is selectively hydrogenated such that no more than about 25% of the aromatic double bonds of block A are reduced by hydrogenation while at least 75% of the aliphatic double bonds of block B are reduced by hydrogenation.

5. A composition according to claim 1 including between about 0 and about 150 parts by weight of a resin compatible with the monoalkenyl arene end blocks, said resin being selected from the group consisting of polymers of alphamethyl styrene, copolymers of alphamethyl styrene and vinyltoluene, coumarone-indene resins, poly(indene) resins, poly(methyl indene) resins and low molecular weight polystyrene resins.

6. A composition according to claim 1 wherein the elastomeric component of said high impact polystyrene is selected from the group consisting of poly(butadiene), styrene-butadiene random copolymers, styrene-butadiene block copolymers, poly(isoprene), natural rubber, silicone rubber, and mixtures thereof.

7. A shoe sole having the composition of claim 1.

8. A composition according to claim 1 wherein the block copolymer has the formula $A-B+(B-A)_n$ where $n$ varies from 1 to 5.

9. A composition according to claim 1 wherein said high impact polystyrene resin comprises 99-65 weight percent of a styrene polymer selected from the group consisting of homopolymers and copolymers of styrene and the nuclear methyl substituted styrenes having a softening point greater than 70° C, and 1-35 weight percent of an elastomeric component.

10. A footwear composition having improved elephant hide, cycle time, mar resistance, and flex-crack resistance comprising:

a. 100 parts by weight of a block copolymer having at least two monoarene polymer end blocks A and at least one elastomeric conjugated diene mid block B, each block A having an average molecular weight between about 5,000 and about 125,000 and each block B having an average molecular weight between about 15,000 and about 250,000, said blocks A comprising 8-65% by weight of the copolymer;

b. 5-125 parts by weight of a high impact polystyrene resin containing from about 1-35 weight percent elastomeric component, said high impact polystyrene having a weight average molecular weight of over about 70,000;

c. 5-175 parts by weight of a hydrocarbon rubber extending oil; and d. 0-250 parts by weight of a finely divided filler.

* * * * *